United States Patent
Zhao et al.

(10) Patent No.: US 9,906,061 B2
(45) Date of Patent: Feb. 27, 2018

(54) QUICK CHARGING MOBILE TERMINAL, METHOD AND SYSTEM

(71) Applicant: JRD COMMUNCATION INC., Shenzhen (CN)

(72) Inventors: Shiqing Zhao, Shenzhen (CN); Longcheng Zhao, Shenzhen (CN)

(73) Assignee: JRD COMMUNICATION INC., Shenzhen (CN)

( * ) Notice: Subject to any disclaimer, the term of this patent is extended or adjusted under 35 U.S.C. 154(b) by 168 days.

(21) Appl. No.: 14/914,401

(22) PCT Filed: Apr. 3, 2015

(86) PCT No.: PCT/CN2015/075890
§ 371 (c)(1),
(2) Date: Feb. 25, 2016

(87) PCT Pub. No.: WO2016/106996
PCT Pub. Date: Jul. 7, 2016

(65) Prior Publication Data
US 2016/0359340 A1    Dec. 8, 2016

(30) Foreign Application Priority Data
Dec. 30, 2014 (CN) .......................... 2014 1 0855345

(51) Int. Cl.
H02J 7/00 (2006.01)
H02J 7/04 (2006.01)

(52) U.S. Cl.
CPC ............ *H02J 7/007* (2013.01); *H02J 7/0021* (2013.01); *H02J 7/0045* (2013.01); *H02J 7/045* (2013.01); *H02J 7/047* (2013.01); *Y02B 40/90* (2013.01)

(58) Field of Classification Search
CPC ....................................................... H02J 7/007
USPC ........................................................ 320/107
See application file for complete search history.

(56) References Cited

U.S. PATENT DOCUMENTS

| 6,100,667 A | 8/2000 | Mercer et al. | |
|---|---|---|---|
| 2012/0098495 A1* | 4/2012 | Yang ...................... | H01M 10/44 320/115 |
| 2016/0036255 A1* | 2/2016 | Aronov ................. | H02J 7/0036 320/126 |
| 2016/0043586 A1* | 2/2016 | Wang .................... | H02J 7/0052 320/107 |
| 2016/0344200 A1* | 11/2016 | Zhang ................... | H02J 7/0073 |

(Continued)

FOREIGN PATENT DOCUMENTS

CN           101783524 A        7/2010

*Primary Examiner* — Suresh Memula
(74) *Attorney, Agent, or Firm* — Shimokaji IP

(57) ABSTRACT

A quick charging mobile terminal, a charger, and a method for charging a mobile terminal are disclosed. The terminal includes: a detecting circuit, used to detect a charging environment of the mobile terminal, the charging environment including at least one of room temperature, battery parameters and charger parameters; a processing circuit, used to obtain an optimal quick charging curve according to the charging environment detected by the detecting circuit, and a charging management circuit, used to charge the mobile terminal according to the optimal quick charging curve and the charging environment. The disclosed terminal can ensure safety and the service life of the terminal while achieving quick charging of the terminal.

20 Claims, 7 Drawing Sheets

(56) References Cited

U.S. PATENT DOCUMENTS

2016/0372940 A1* 12/2016 Canadi ............... G01R 31/3658
2016/0380462 A1* 12/2016 Zhang ....................... H02J 7/04
                                                         320/107
2017/0256960 A1*  9/2017 Shin ...................... H02J 7/0029

* cited by examiner

QUICK CHARGING MOBILE TERMINAL, METHOD AND SYSTEM

TECHNICAL FIELD

The present disclosure relates to the field of quick charging technologies, and in particular, to methods and systems for quick charging mobile terminals.

BACKGROUND

Along with the development of science and technology and the ever-increasing living standard of people, applications of smart terminals, which are often called mobile terminals as well, are becoming broader, and people are increasingly depending on various smart terminals. Smart terminals have become an indispensable tool for people, and in addition to making phone calls and sending messages, smart terminals may further be used for various forms of entertainment such as watching movies, playing games and accessing the Internet, causing the power consumption of the smart terminals to be very high.

Meanwhile, the smart terminals are often used for a long time, and in order to obtain better user experiences, display screens of the smart terminals are made increasingly bigger, further increasing the power consumption of the smart terminals. Therefore, manufacturers generally increase the electric capacity of the smart terminals to meet the requirements of people, and people use portable power sources to assist charging of smart terminals.

As the battery capacity of the smart terminal increases, the charging time thereof becomes longer. The capacity of the portable power source is limited, and the large-capacity portable power source also has an over-long charging time, so that a situation that the portable power source and the smart terminal both run out easily occurs. Meanwhile, using the smart terminal while using the portable power source may cause irreparable losses for the battery, and the battery is less durable. Therefore, the power of the smart terminal is severely insufficient for people to use.

SUMMARY

The present disclosure provides methods and systems for quick charging mobile terminals, which can conduct quick charging on the mobile terminals while guaranteeing the service life of a power source of the mobile terminal.

In an embodiment, a quick charging mobile terminal includes: a detecting circuit, a processing circuit, and a charging management circuit;

the detecting circuit is configured to detect a charging environment of the mobile terminal when the mobile terminal is connected to a charger for charging, the charging environment may include at least one of room temperature, battery parameters and charger parameters, where the detecting circuit may include a first detecting sub-circuit, a second detecting sub-circuit and a third detecting sub-circuit, the first detecting sub-circuit is configured to detect the room temperature and the battery temperature, the second detecting sub-circuit is configured to detect the battery parameters, and the third detecting sub-circuit is configured to obtain the charger parameters through a charger interface;

the processing circuit is configured to obtain an optimal quick charging curve according to the charging environment detected by the detecting circuit, select a first relatively high current allowed by the battery parameters from a charging current range for charging when it is determined that the battery parameters indicate that charging with the first relatively high current is allowed, or select a second relatively high current or voltage allowed under the room temperature from a charging current or voltage range for charging when it is determined that the room temperature indicates that charging with the second relatively high current or voltage is allowed, or select a third relatively high current or voltage allowed by the charger parameters from a charging current or voltage range for charging when it is determined that the charger parameters indicate that charging with the third relatively high current or voltage is allowed; and the charging management circuit is configured to increase the charging power input to the mobile terminal according to the optimal quick charging curve obtained by the processing circuit, so as to charge the mobile terminal, where the charging management circuit may include a current control sub-circuit, a voltage control sub-circuit, a pulse width modulation sub-circuit, and a charging control sub-circuit, the current control sub-circuit is configured to control the charging current to be in a safe current range of the charging environment of the mobile terminal according to parameters detected by the detecting circuit or preset in the mobile terminal;

the voltage control sub-circuit is configured to: when the voltage of the mobile terminal is in a preset safe voltage range, convert the voltage into an AC voltage and transmit the AC voltage to the pulse width modulation sub-circuit;

the pulse width modulation sub-circuit is configured to adjust, according to the optimal quick charging curve obtained by the processing circuit, a pulse width of the AC voltage converted by the voltage control sub-circuit, so as to adjust the charging voltage; and the charging control sub-circuit is configured to control, according to the charging environment detected by the detecting circuit and the optimal quick charging curve obtained by the processing circuit, a switch to be switched on so that the charging voltage adjusted by the pulse width modulation sub-circuit charges the battery of the mobile terminal; and when the battery of the mobile terminal is fully charged, switch off the switch.

The processing circuit is further configured to: when an input voltage detected by the detecting circuit exceeds +5 v and the battery level is less than or equal to a first threshold, control the pulse width modulation sub-circuit to real-time adjust the pulse width of the AC voltage output by the voltage control sub-circuit, convert the voltage into an appropriate DC charging voltage lower than +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the first threshold and less than a second threshold, control the pulse width modulation sub-circuit to real-time adjust the pulse width of the AC voltage output by the voltage control sub-circuit, convert the AC voltage into an appropriate DC charging voltage exceeding +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the second threshold, control the pulse width modulation sub-circuit to real-time adjust the pulse width of the AC voltage to be wider, gradually reduce the charging voltage, and control the charging control sub-circuit to switch on the switch, so as to charge the battery of the mobile terminal by using the optimal charging current in the optimal charging curve;

the processing circuit is further configured to: when an input voltage detected by the detecting circuit is +5 v and the battery level is less than the first threshold, control the pulse width modulation sub-circuit to real-time adjust the pulse width of the AC voltage, convert the AC voltage into an appropriate DC charging voltage lower than +5 v, and control the charging control sub-circuit to switch on the switch, so as to charge the battery of the mobile terminal by using the optimal charging current in the optimal charging curve; and the processing circuit is further configured to: when an input voltage detected by the detecting circuit is +5 v and the battery level is greater than the first threshold, control the pulse width modulation sub-circuit to real-time adjust the pulse width of the AC voltage output, convert the AC voltage into an appropriate DC charging voltage being +5 v, and control the switch to be switched on, so as to charge the battery of the mobile terminal.

A battery cabin of the mobile terminal may include a fool-proof structure, the fool-proof structure is only applicable for a battery of a quick charging type to mount into the battery cabin; the terminal may further include a display unit, and the display unit is configured to display one or more charging solutions corresponding to the optimal quick charging curve, the charging amount, the charging time, and the residual charging time.

Another embodiment provides a quick charging mobile terminal, where the terminal includes: a detecting circuit, a processing circuit, and a charging management circuit, the detecting circuit is configured to detect a charging environment of the mobile terminal when the mobile terminal is connected to a charger for charging, the charging environment including at least one of room temperature, battery parameters and charger parameters;

the processing circuit is configured to obtain an optimal quick charging curve according to the charging environment detected by the detecting circuit, select a first relatively high current allowed by the battery parameters from a charging current range for charging when it is determined that the battery parameters indicate that charging with the first relatively high current is allowed, or select a second relatively high current or voltage allowed under the room temperature from a charging current or voltage range for charging when it is determined that the room temperature indicates that charging with the second relatively high current or voltage is allowed, or select a third relatively high current or voltage allowed by the charger parameters from a charging current or voltage range for charging when it is determined that the charger parameters indicate that charging with the third relatively high current or voltage is allowed; and the charging management circuit is configured to control the charging power input to the mobile terminal according to the optimal quick charging curve obtained by the processing circuit and a charger input voltage, so as to charge the mobile terminal.

In another embodiment, the charging management circuit may include a current control sub-circuit, a voltage control sub-circuit, a pulse width modulation sub-circuit, and a charging control sub-circuit, the current control sub-circuit is configured to control the charging current to be in a safe current range of the charging environment of the mobile terminal according to battery parameters detected by the detecting circuit or preset in the mobile terminal;

the voltage control sub-circuit is configured to: when the voltage of the mobile terminal is in a preset safe voltage range, convert the voltage into an AC voltage and transmit the AC voltage to the pulse width modulation sub-circuit;

the pulse width modulation sub-circuit is configured to adjust, according to the optimal quick charging curve obtained by the processing circuit, a pulse width of the AC voltage converted by the voltage control sub-circuit, so as to adjust the charging voltage; and the charging control sub-circuit is configured to control, according to the charging environment detected by the detecting circuit and the optimal quick charging curve obtained by the processing circuit, a switch to be switched on so that the charging voltage adjusted by the pulse width modulation sub-circuit charges the battery of the mobile terminal; and when the battery of the mobile terminal is fully charged, switch off the switch.

In another embodiment, the processing circuit is further configured to: when an input voltage detected by the detecting circuit exceeds +5 v and the battery level is less than or equal to a first threshold, control the pulse width modulation sub-circuit to real-time adjust the pulse width of the AC voltage output by the voltage control sub-circuit, convert the AC voltage into an appropriate DC charging voltage lower than +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the first threshold and less than a second threshold, control the pulse width modulation sub-circuit to real-time adjust the pulse width of the AC voltage output by the voltage control sub-circuit, convert the AC voltage into an appropriate DC charging voltage exceeding +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the second threshold, control the pulse width modulation sub-circuit to real-time adjust the pulse width of the AC voltage to be wider, gradually reduce the charging voltage, and control the charging control sub-circuit to switch on the switch, so as to charge the battery of the mobile terminal by using the optimal charging current in the optimal charging curve;

the processing circuit is further configured to: when an input voltage detected by the detecting circuit is +5 v and the battery level is less than the first threshold, control the pulse width modulation sub-circuit to real-time adjust the pulse width of the AC voltage, convert the voltage into an appropriate DC charging voltage lower than +5 v, and control the charging control sub-circuit to switch on the switch, so as to charge the battery of the mobile terminal by using the optimal charging current in the optimal charging curve; and the processing circuit is further configured to: when an input voltage detected by the detecting circuit is +5 v and the battery level is greater than the first threshold, control the pulse width modulation sub-circuit to real-time adjust the pulse width of the AC voltage output, convert the AC voltage into a DC charging voltage being +5 v, and control the switch to be switched on, so as to charge the battery of the mobile terminal.

In another embodiment, the detecting circuit may include a first detecting sub-circuit, a second detecting sub-circuit and a third detecting sub-circuit, the first detecting sub-circuit is used to detect the room temperature and the battery temperature, the second detecting sub-circuit is used to detect the battery parameters, and the third detecting sub-circuit is used to obtain the charger parameters through a charger interface.

In another embodiment, a battery cabin of the mobile terminal may include a fool-proof structure, the fool-proof structure may be only applicable for a battery of a quick charging type to mount into the battery cabin; the terminal may further include a display unit, and the display unit is configured to display one or more charging solutions corresponding to the optimal quick charging curve, the charging amount, the charging time, and the residual charging time.

Another embodiment provides a quick charging method, and the method may include:

detecting a charging environment of a mobile terminal when the mobile terminal is connected to a charger for charging, the charging environment including at least one of room temperature, battery parameters and charger parameters;

obtaining an optimal quick charging curve according to the charging environment, selecting a first relatively high current allowed by the battery parameters from a charging current range for charging when it is determined that the battery parameters indicate that charging with the first relatively high current is allowed, or selecting a second relatively high current or voltage allowed under the room temperature from a charging current or voltage range for charging when it is determined that the room temperature indicates that charging with the second relatively high or voltage is allowed, or selecting a third relatively high current or voltage allowed by the charger parameters from a charging current or voltage range for charging when it is determined that the charger parameters indicate that charging with the third relatively high current or voltage is allowed; and increasing the charging power input to the mobile terminal according to the charging environment, the optimal quick charging curve and a charger input voltage, so as to charge the mobile terminal.

In another embodiment, the step of controlling the charging power input to the mobile terminal according to the optimal quick charging curve to charge the mobile terminal may include:

controlling a charging input current to be lower than the maximum safe current in the charging environment of the mobile terminal;

when an input voltage of the mobile terminal is in a preset safe voltage range, converting the voltage into an AC voltage;

adjusting a pulse width of the AC voltage according to the optimal quick charging curve, so as to adjust the charging voltage; and switching on a switch according to the charging environment and the optimal quick charging curve, so as to charge a battery of the mobile terminal;

and switching off the switch when the battery is fully charged.

In another embodiment, the step of switching on a switch according to the charging environment and the optimal quick charging curve, so as to charge a battery of the mobile terminal; and switching off the switch when the battery is fully charged specifically may include:

when the input voltage exceeds +5 v and the battery level is less than or equal to a first threshold, according to the charging environment and the optimal quick charging curve, converting the input voltage into an AC voltage, real-time adjusting the pulse width of the AC voltage, and converting the voltage into an appropriate DC charging voltage lower than +5 v, so as to charge the battery of the mobile terminal by using the optimal charging current in the optimal charging curve;

when the input voltage exceeds +5 v and the battery level is greater than the first threshold and less than a second threshold, according to the charging environment and the optimal quick charging curve, converting the input voltage into an AC voltage, real-time adjusting the pulse width of the AC voltage, and converting the voltage into an appropriate DC charging voltage exceeding +5 v, so as to charge the battery of the mobile terminal by using the optimal charging current in the optimal charging curve;

when the input voltage exceeds +5 v and the battery level is greater than the second threshold, according to the charging environment and the optimal quick charging curve, converting the input voltage into an AC voltage, real-time adjusting the pulse width of the AC voltage to be wider, and gradually reducing the charging voltage, so as to charge the battery of the mobile terminal;

when the input voltage is +5 v and the battery level is less than the first threshold, converting the input voltage of +5 v into an AC voltage, adjusting the pulse width of the AC voltage, and converting the voltage into an appropriate DC charging voltage lower than +5 v, so as to charge the battery of the mobile terminal by using the optimal charging current in the optimal charging curve; and when the input voltage is +5 v and the battery level is greater than the first threshold, charging the battery of the mobile terminal by using a constant DC charging voltage of +5 v.

Another embodiment provides a quick charging system, and the system may include a charger, and a mobile terminal. The mobile terminal may include a detecting circuit, a processing circuit, a charging management circuit. The charger may include an AC/DC converting module, a voltage processing module, and an interface module. The detecting circuit is configured to detect a charging environment of the terminal when being connected to the charger for charging, the processing circuit is configured to obtain an optimal quick charging curve according to the charging environment detected by the detecting circuit, the charging management circuit is configured to increase, according to the charging environment detected by the detecting circuit, the optimal quick charging curve obtained by the processing circuit and a charger input voltage, a charging power input to the mobile terminal, so as to charge the mobile terminal. The AC/DC converting module is configured to convert an obtained external voltage into a fixed DC voltage greater than +5 v or equal to +5 v and output the DC voltage to the terminal. The voltage processing module is configured to receive information sent by the terminal, and control the AC/DC converting module to convert the obtained external voltage into the fixed voltage greater than +5 v or equal to +5 v. The interface module is configured to output the constant voltage greater than +5 v or equal to +5 v to the detecting module.

In another embodiment the interface module may be a USB interface module, and if the charger is a charger outputting a fixed voltage greater than +5 v, the USB interface module may include a fool-proof structure. The fool-proof structure may be merely applicable to connect to a terminal supporting a charging voltage greater than +5 v. Alternatively, the interface module may be a non-USB interface module, the non-USB interface module may include an adapter, and the adapter may be used to match interfaces of different terminals.

The present disclosure has the beneficial effects of increased charging speed for the battery of the mobile terminal without inducing any damaging impact to the battery service life which may be caused by fast charging of a low level battery. When a battery having a low battery level is charged, the speed of an electrochemical reaction conducted on an electrode lags behind the running speed of electrons on the electrode, an electrochemical polarization phenomenon, briefly referred to as a polarization phenomenon will occur, and a severe polarization phenomenon will occur when the battery level is low, thereby generating a high current. The over-high current will severely damage the service life of the battery of the smart terminal. To extend the service life of the battery, in the prior art, when the battery of the smart terminal is charged, a low voltage may be used first to generate a constant current in a safe current range to charge the mobile terminal, and the voltage may be increased when the polarization phenomenon becomes weak, and finally, the smart terminal may be charged by using a constant voltage. This manner does not cause severe damage to the battery; however, the time for charging the smart terminal may be too long, and cannot meet the requirements of people. In the present disclosure, by detecting the charging environment and setting the current control circuit and the voltage control circuit, the charging voltage may start to be increased according to the battery optimal charging curve in the safe temperature, voltage and current ranges of the battery, so as to ensure that the mobile terminal is charged by using the optimal constant current. According to the formula that the charging power P=the voltage U*the current I, the current may not be changed while the voltage is increased, thereby increasing the charging power for charging the battery of the mobile terminal. When the battery level is high, the charging voltage/current is then reduced to ensure charging the mobile terminal by using the optimal charging curve, thereby extending the service life of the battery. Different from the prior art, the present disclosure can increase the charging voltage to ensure long-time charging by using the optimal constant current in the optimal charging curve, thereby accelerating the charging speed.

DETAILED DESCRIPTION

The present disclosure is described in detail through the accompanying drawings and embodiments.

To ensure that the embodiments of the present disclosure can be implemented normally, a mobile terminal of the present disclosure has a built-in detecting circuit configured to detect the room temperature and connected to a processing circuit of the mobile terminal, so that room temperature data detected by the detecting circuit can be transmitted to the processing circuit of the mobile terminal. For example, a thermistor is disposed in the mobile terminal, and the processing circuit of the mobile terminal obtains, according to a relationship between the resistance of the thermistor and the temperature, the room temperature of the place where the mobile terminal is located. In a specific implementation, a detecting circuit may also be disposed to directly transmit a room temperature value to the mobile terminal. In the mobile terminal, a battery is a battery supporting charging with a high voltage. If it is intended to conduct quick charging, a charger supporting output of a high voltage may be further provided. The mobile terminal reads charger parameters from a VBUS pin or an ID pin of the charger.

Figure 2:
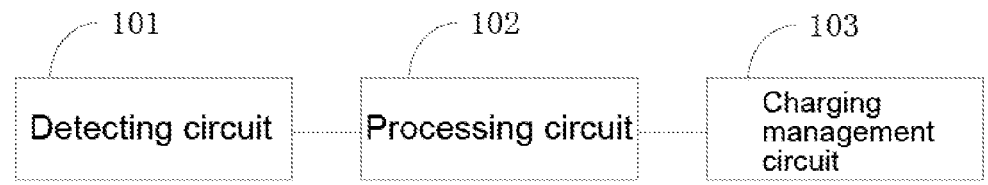
FIG. 2 depicts a schematic structural diagram of an embodiment of a quick charging mobile terminal according to the present disclosure.

Referring to FIG. 2, FIG. 2 depicts a schematic structural diagram of an embodiment of a quick charging mobile terminal according to the present disclosure. The present disclosure provides a quick charging mobile terminal, which may include a detecting circuit 101, a processing circuit 102 and a charging management circuit 103 that may be connected sequentially.

The detecting circuit 101 may be used to detect a charging environment of the mobile terminal when the mobile terminal is connected to a charger for charging, the charging environment including at least one of room temperature, battery parameters and charger parameters.

The processing circuit 102 may be used to obtain an optimal quick charging curve according to the charging environment detected by the detecting circuit 101, select a first relatively high current allowed by the battery parameters from a charging current range for charging when it is determined that the battery parameters indicate that charging with a large current is allowed, and/or select a relatively high current or voltage allowed under the room temperature from a charging current or voltage range for charging when it is determined that the room temperature indicates that charging with the first relatively high current or voltage is allowed, or select a second relatively high current or voltage allowed by the charger parameters from a charging current or voltage range for charging when it is determined that the charger parameters indicate that charging with the second relatively high current or voltage is allowed.

The charging management circuit 103 may be used to control the charging power input to the mobile terminal according to the optimal quick charging curve obtained by the processing circuit 102 and a charger input voltage, so as to charge the mobile terminal.

Figure 1:
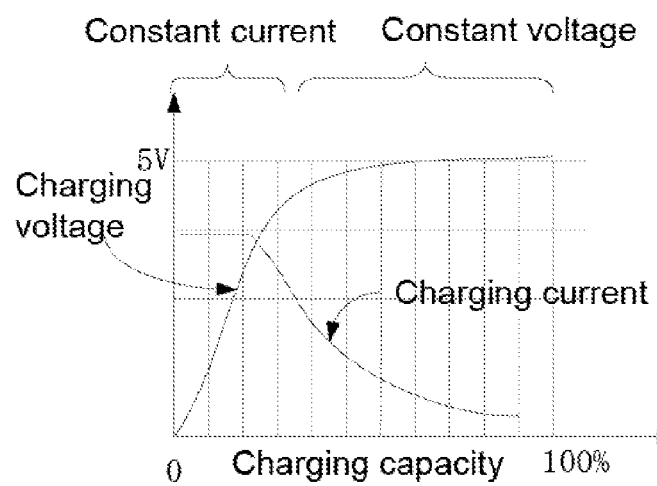
FIG. 1 depicts a schematic diagram of charging current, voltage and capacity of a battery in the prior art.
Figure 4:
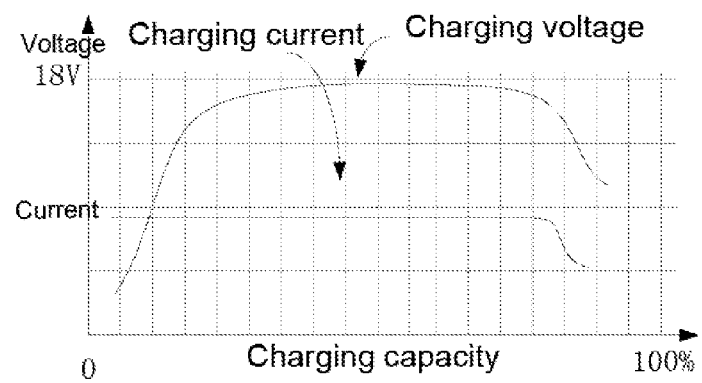
FIG. 4 depicts a schematic diagram of current, voltage and capacity of an embodiment of a quick charging mobile terminal according to the present disclosure.

Generally, when a battery having a low battery level is charged, the speed of an electrochemical reaction conducted on an electrode lags behind the running speed of electrons on the electrode, an electrochemical polarization phenomenon, briefly referred to as a polarization phenomenon will occur. A severe polarization phenomenon will occur when the battery level is low, thereby generating high current, and the high current will severely damage the service life of the battery of the smart terminal. To extend the service life of the battery, in the prior art, when the battery of the smart terminal is charged, a low voltage may be used first to generate a constant current in a safe current range to charge the mobile terminal, and the voltage may be increased when the polarization phenomenon becomes weak, and finally, the smart terminal may be charged by using a constant voltage. This manner does not cause severe damage to the battery; however, the time for charging the smart terminal may be too long, and cannot meet the requirements of people. Directed to the above technical features, in the present disclosure, by detecting the charging environment and setting the current control circuit and the voltage control circuit, the charging voltage may start to be increased according to the optimal charging curve in the safe temperature, voltage and current ranges of the battery, so as to ensure that the mobile terminal is charged by using the optimal constant current. According to the formula that the charging power P=the voltage U*the current I, the current is not changed while the voltage is increased, thereby increasing the charging power for charging the battery of the mobile terminal. When the battery level is high, the charging voltage/current may then be reduced to ensure charging the mobile terminal by using the optimal charging curve, thereby guaranteeing the service life of the battery. Comparing the schematic diagram of a charging curve in the prior art and the schematic diagram of a charging curve in the present disclosure: FIG. 1 and FIG. 4, one can see that the embodiments in the present disclosure can increase the charging voltage to ensure longer time charging by using the optimal constant current in the optimal charging curve, thereby increasing the charging power and accelerating the charging speed.

Figure 3:
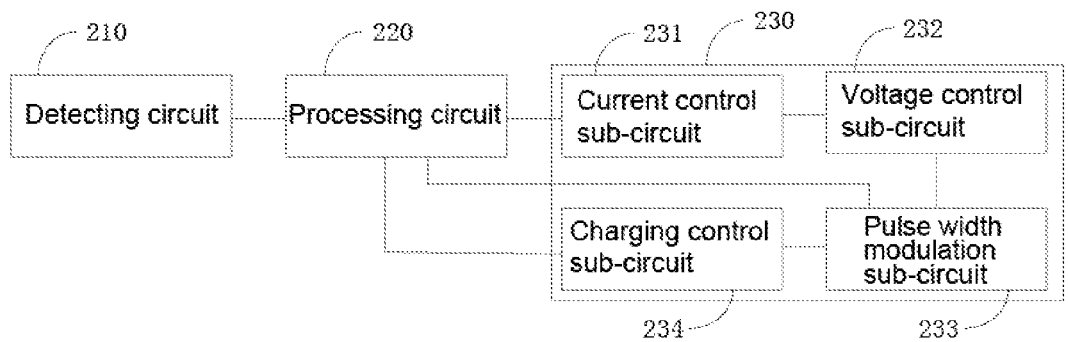
FIG. 3 depicts a schematic structural diagram of an embodiment of a quick charging mobile terminal according to the present disclosure.
Figure 5:
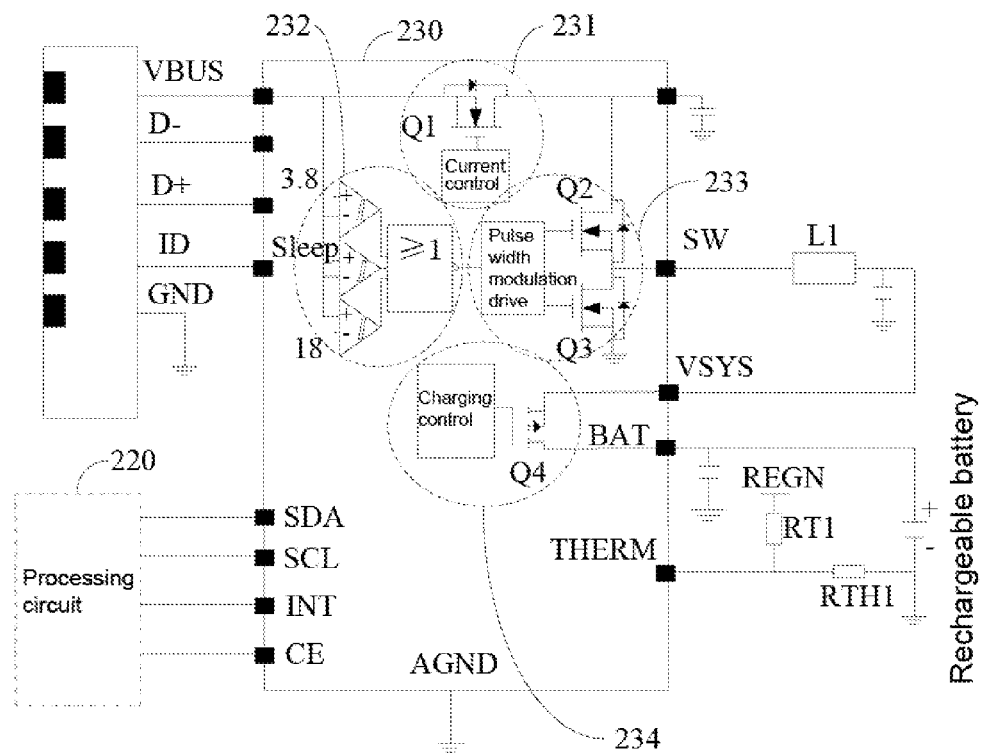
FIG. 5 depicts a schematic structural circuit diagram of an embodiment of a quick charging mobile terminal according to the present disclosure.

Referring to FIG. 3, FIG. 4 and FIG. 5, FIG. 3 depicts a schematic structural diagram of another embodiment of a quick charging mobile terminal according to the present disclosure, FIG. 4 depicts a schematic diagram of current, voltage and capacity of another embodiment of a quick charging mobile terminal according to the present disclosure, and FIG. 5 depicts s a schematic structural block diagram of another embodiment of a quick charging mobile terminal according to the present invention. The embodiment provides a quick charging mobile terminal, including: a detecting circuit 210, a processing circuit 220, a charging management circuit 230, where the charging management circuit 230 includes a current control sub-circuit 231, a voltage control sub-circuit 232, a pulse width modulation sub-circuit 233, a charging control sub-circuit 234, where the detecting circuit 210, the processing circuit 220, the current control sub-circuit 231, the voltage control sub-circuit 232, the pulse width modulation sub-circuit 233 and the charging control sub-circuit 234 may be connected sequentially, the processing circuit 220 is further connected to the pulse width modulation sub-circuit 233 and the charging control sub-circuit 234.

The detecting circuit 210 may be used to detect a charging environment of the mobile terminal when the mobile terminal is connected to a charger for charging, the charging environment including at least one of room temperature, battery parameters and charger parameters.

The processing circuit 220 may be used to obtain an optimal quick charging curve according to the charging environment detected by the detecting circuit 210, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

The current control sub-circuit 231 may be used to control the charging current to be in a safe current range of the charging environment of the mobile terminal according to parameters detected by the detecting circuit 210 or preset in the mobile terminal.

The voltage control sub-circuit 232 may be used to: when the voltage of the mobile terminal is in a preset safe voltage range, convert the input voltage into an AC voltage and transmit the AC voltage to the pulse width modulation sub-circuit 233, and when the battery of the mobile terminal is fully charged, convert the voltage into a low level and transmit the voltage to the pulse width modulation sub-circuit 233.

For different terminal manufacturers, types, manufacturing processes and battery capacities of batteries used in terminals thereof are different, and for different types of batteries, resistance changes of the batteries are different as the temperature varies. Therefore, optimal charging curves, safe voltage ranges and safe current ranges of the batteries are different. Before leaving the factory, the manufacturer presets a charging voltage range and a safe current charging range of a mobile terminal according to a battery used, for example, the safe voltage range is set to (3.8 v, 18 v), and in a specific implementation, different safe voltage range may beset according to current types, for example, a lithium battery cannot be lower than 2 v or 2.5 v. If the charger output voltage VBUS entering the voltage control sub-circuit 232 in the mobile terminal is in the range, 3.8 v<voltage VBUS<18 v, for example, the voltage VBUS is 10 v, the voltage control sub-circuit 232 converts the voltage VBUS into an AC voltage, for example, converts the voltage VBUS into an AC voltage having a peak of 10 v; if the charger output voltage VBUS entering the voltage control sub-circuit 232 in the mobile terminal is less than 3.8 v or greater than 18 v, for example, 20 v, the voltage control sub-circuit 232 converts the voltage VBUS into a low level. Meanwhile, when the battery is fully charged, the charging control sub-circuit 234 is controlled to switch off a switch to stop charging.

In an embodiment, a battery cabin of the mobile terminal may be used for fool-proof configuration, so as to prevent other batteries to be placed in, or the battery is permanently disposed in the mobile terminal so that the batter is fixed in the terminal without being replaced, and in this case, parameters of the battery are preset in the terminal, such as, the maximum charging current, the optimal quick charging curve and the appropriate environment temperature.

The pulse width modulation sub-circuit 233 may be used to adjust, according to the optimal quick charging curve obtained by the processing circuit 220, a pulse width of the AC voltage converted by the voltage control sub-circuit 232, so as to adjust the charging voltage.

The pulse width modulation sub-circuit 233 may receive the AC voltage converted by the voltage control sub-circuit 232 and real-time adjusts the pulse width of the AC voltage according to the optimal quick charging curve obtained by the processing circuit 220. For example, when the battery capacity is low, before the battery level reaches 5%, in the specific implementation, charging may not be conducted by using a large voltage to avoid generating a large charging current which may damage the battery. When the battery capacity reaches a certain value, applying a high voltage to the battery will not generate a high current. The pulse width modulation sub-circuit 233 may first adjusts the pulse width of the AC voltage to be wider, and converts the AC voltage into DC voltage after passing Q2 and Q3. For example, the AC voltage may be converted to the DC voltage having the voltage of +3 v according to the parameters such as the battery capacity and battery temperature detected by the detecting circuit 210 and the optimal charging curve obtained by the processing circuit 220. In different embodiment, the DC voltage values converted according to the parameters such as the battery capacity may be different. As the charging time goes by, the battery capacity gradually increases, and after the battery capacity reaches a certain value, for example, 20%, the battery can be charged by using a high voltage, the pulse width of the AV voltage may be adjusted to be narrower, so as to increase the charging voltage to generate the constant optimal charging current in the optimal charging curve to charge the mobile terminal. When the battery capacity is high, for example, 85%, a general battery may use a small current to charge to protect the battery in consideration of factors such as the battery temperature, the battery characteristic and the battery type. In an embodiment, the pulse width modulation sub-circuit 233 may further adjust the pulse width of the AC voltage to be wider, so as to reduce the charging voltage, thereby reducing the current to charge the battery of the mobile terminal, and protecting the battery. In an embodiment, in various stages of the process of charging the mobile terminal, the optimal charging current may be fluctuated due to different battery temperatures and different battery types.

The charging control sub-circuit 234 may be used to control, according to the charging environment detected by the detecting circuit 210 and the optimal quick charging curve obtained by the processing circuit 220, a switch to be switched on, so that the charging voltage adjusted by the pulse width modulation sub-circuit 233 charges the battery of the mobile terminal.

Meanwhile, in an embodiment, the terminal of the present disclosure may supports charging by using the conventional +5 v voltage. If the charger is a conventional +5 v charger, the mobile terminal may be charged by a constant current first and then by a constant voltage with the above method according to the optimal charging curve. In an embodiment, multiple charging modes may be further set, for example, quick, relatively quick, and normal. Meanwhile, a user may manually select a charging solution, and when the user feels that quick charging is not needed, the user selects another charging mode for charging, for example, selects a relatively quick mode or a normal charging mode.

In the present disclosure, by detecting the charging environment, setting the current control circuit and the voltage control circuit, conducting charging by using the charger supporting a high voltage input according to the optimal charging curve in the safe temperature, voltage and current ranges of the battery, converting the high DC voltage input by the charger into the AC voltage, and adjusting the pulse width of the AC voltage according to the optimal charging curve, thereby adjusting to the charging voltage, the mobile terminal is charged by using the optimal constant current, which increases the charging power, adjusts the charging power in real time according to the charging environment, improves the charging speed, and ensures the service life of the battery.

Figure 6:
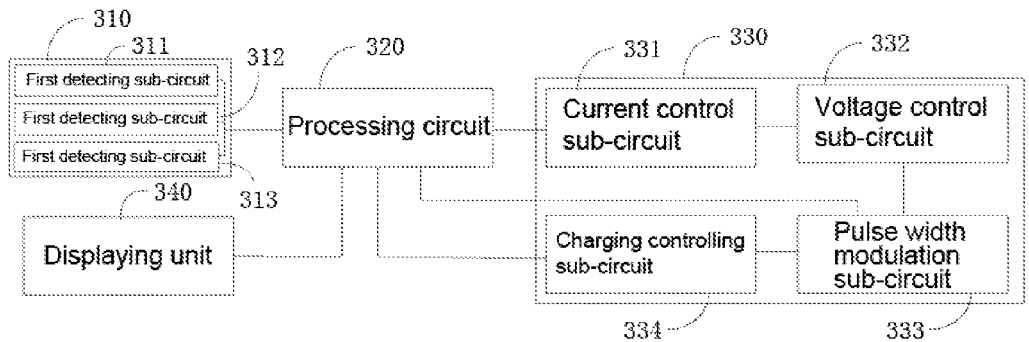
FIG. 6 depicts a schematic structural diagram of an embodiment of a quick charging mobile terminal according to the present disclosure.

Referring to FIG. 6, FIG. 6 depicts a schematic structural diagram of a another embodiment of a quick charging mobile terminal according to the present disclosure. The embodiment provides a quick charging mobile terminal, including: a detecting circuit 310, a processing circuit 320, a charging management circuit 330, and a displaying unit 340, where the detecting circuit 310 includes a first detecting sub-circuit 311, a second detecting sub-circuit 312 and a third detecting sub-circuit 313, the charging management circuit 330 includes a current control sub-circuit 331, a voltage control sub-circuit 332, a pulse width modulation sub-circuit 333, a charging control sub-circuit 334, the processing circuit 320 is respectively connected to the first detecting sub-circuit 311, the second detecting sub-circuit 312, the third detecting sub-circuit 313, the current control sub-circuit 331, the voltage control sub-circuit 332, the pulse width modulation sub-circuit 333, the charging control sub-circuit 334 and the display unit 340, and the current control sub-circuit 331, the voltage control sub-circuit 332, the pulse width modulation sub-circuit 333 and the charging control sub-circuit 334 are connected sequentially.

The first detecting sub-circuit 311 may be used to detect the room temperature and the battery temperature.

The second detecting sub-circuit 312 may be used to detect the battery parameters.

The third detecting sub-circuit 313 may be used to obtain charger parameters through a charger interface.

The processing circuit 320 may be used to obtain an optimal quick charging curve according to the charging environment detected by the detecting circuit 310, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

The current control sub-circuit 331 may be used to control the charging current to be in a safe current range of the charging environment of the mobile terminal according to battery parameters detected by the detecting circuit 310 or preset in the mobile terminal.

The voltage control sub-circuit 332 may be used to convert the voltage into an AC voltage and transmit the AC voltage to the pulse width modulation sub-circuit 333 when the voltage of the mobile terminal is in a preset safe voltage range.

The pulse width modulation sub-circuit 333 may be used to adjust, according to the optimal quick charging curve obtained by the processing circuit 320, a pulse width of the AC voltage converted by the voltage control sub-circuit 332, so as to adjust the charging voltage.

The charging control sub-circuit 334 may be used to control, according to the charging environment detected by the detecting circuit 310 and the optimal quick charging curve obtained by the processing circuit 320, a switch to be switched on so that the charging voltage adjusted by the pulse width modulation sub-circuit 333 charges the battery of the mobile terminal.

The display unit 340 may be used to display the combination of one or more of a charging solution, the charging amount, the charging time, and the residual charging time.

In an embodiment, the processing circuit 320 may further pre-store a chart corresponding to the optimal quick charging curve, match the pre-stored corresponding chart according to parameters of the charging environment after the detecting circuit 310 detects the charging environment, and look for a corresponding execution manner. The charging management circuit 330 may charge the mobile terminal according to the execution manner, and the displaying unit 340 displays the charging.

Figure 7:
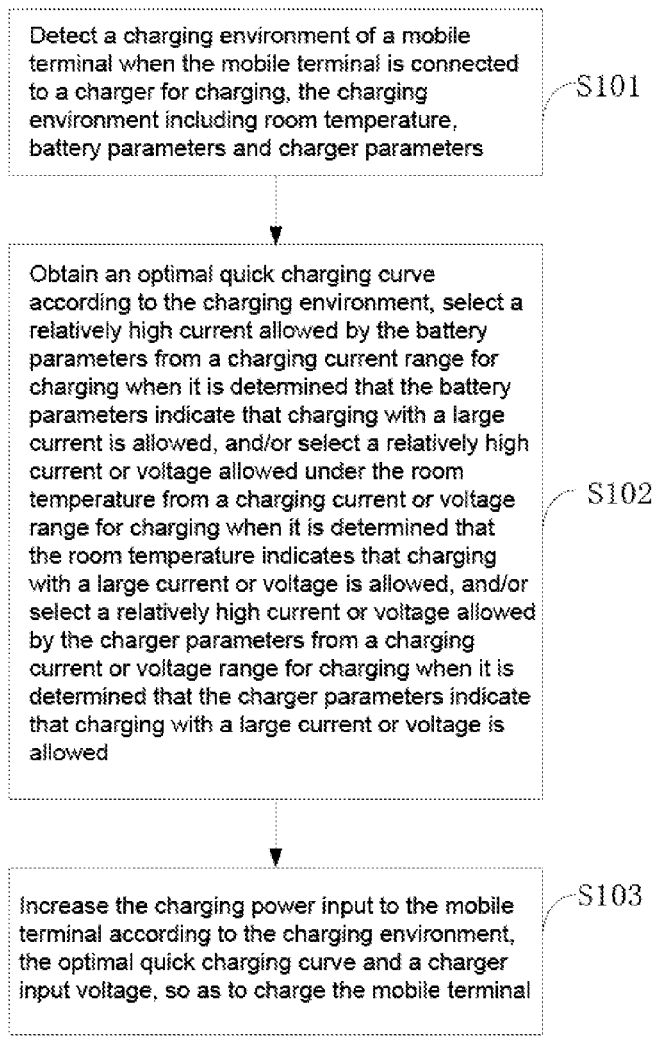
FIG. 7 depicts a schematic flow chart of an embodiment of a quick charging method of a mobile terminal according to the present disclosure.

Referring to FIG. 7, FIG. 7 depicts a schematic flow chart of an embodiment of a quick charging method of a mobile terminal according to the present invention. The method includes the following steps: S101, S102, and S103.

S101: Detect a charging environment of the mobile terminal when the mobile terminal is connected to a charger for charging, the charging environment including the combination of at least one or more than two of room temperature, battery parameters and charger parameters.

When the mobile terminal is connected to a charger for charging, the mobile terminal reads charger parameters through a charger VBUS output voltage pin or a charger ID pin, detects the battery temperature by using a thermistor built in the battery, and detects the room temperature by using a thermistor connected to a central processing unit of the terminal. The central processing unit of the terminal determines the battery temperature and the room temperature according to changes of resistances of the two thermistors and changes of temperatures. By reading a charging chip of the battery, the battery parameters such as the battery type, the capacity and the safe current are obtained, and in the specific implementation, the shape of the terminal is used to perform a fool-proof configuration, or the battery is fixed in the terminal, and fixed parameters related to the battery are preset in the terminal. Then, the process proceeds to step S102.

S102: Obtain an optimal quick charging curve according to the charging environment, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

According to the charging environment parameters such as the room temperature, the battery parameters and the charger parameters obtain in the step S101, the optimal charging curve of the battery may be obtained through calculation, or the optimal charging curve may be preset in the mobile phone before leaving the factory. According to the charging environment detected in the step S101 and the optimal charging curve, a first relatively high current allowed by the battery parameters is selected from a charging current range for charging when it is determined that the battery parameters indicate that charging with the first relatively high current is allowed, and/or a second relatively high current or voltage allowed under the room temperature is selected from a charging current or voltage range for charging when it is determined that the room temperature indicates that charging with the second relatively high current or voltage is allowed, and/or a third relatively high current or voltage allowed by the charger parameters is selected from a charging current or voltage range for charging when it is determined that the charger parameters indicate that charging with the third relatively high current or voltage is allowed.

S103: Increase the charging power input to the mobile terminal according to the charging environment, the optimal quick charging curve and a charger input voltage, so as to charge the mobile terminal.

According to the charging environment and the optimal charging curve obtained in the steps S101 and S102, if the charger is a charger supporting a high voltage output and an output voltage thereof is within a preset circuit safe voltage range, the charging power of the mobile terminal may be increased according to the charging voltage, the optimal charging curve and the optimal charging curve, so as to charge the mobile terminal. If the charger is a conventional +5 v charger, the mobile terminal may be charged according to the optimal charging curve of the +5 v voltage.

Figure 8:
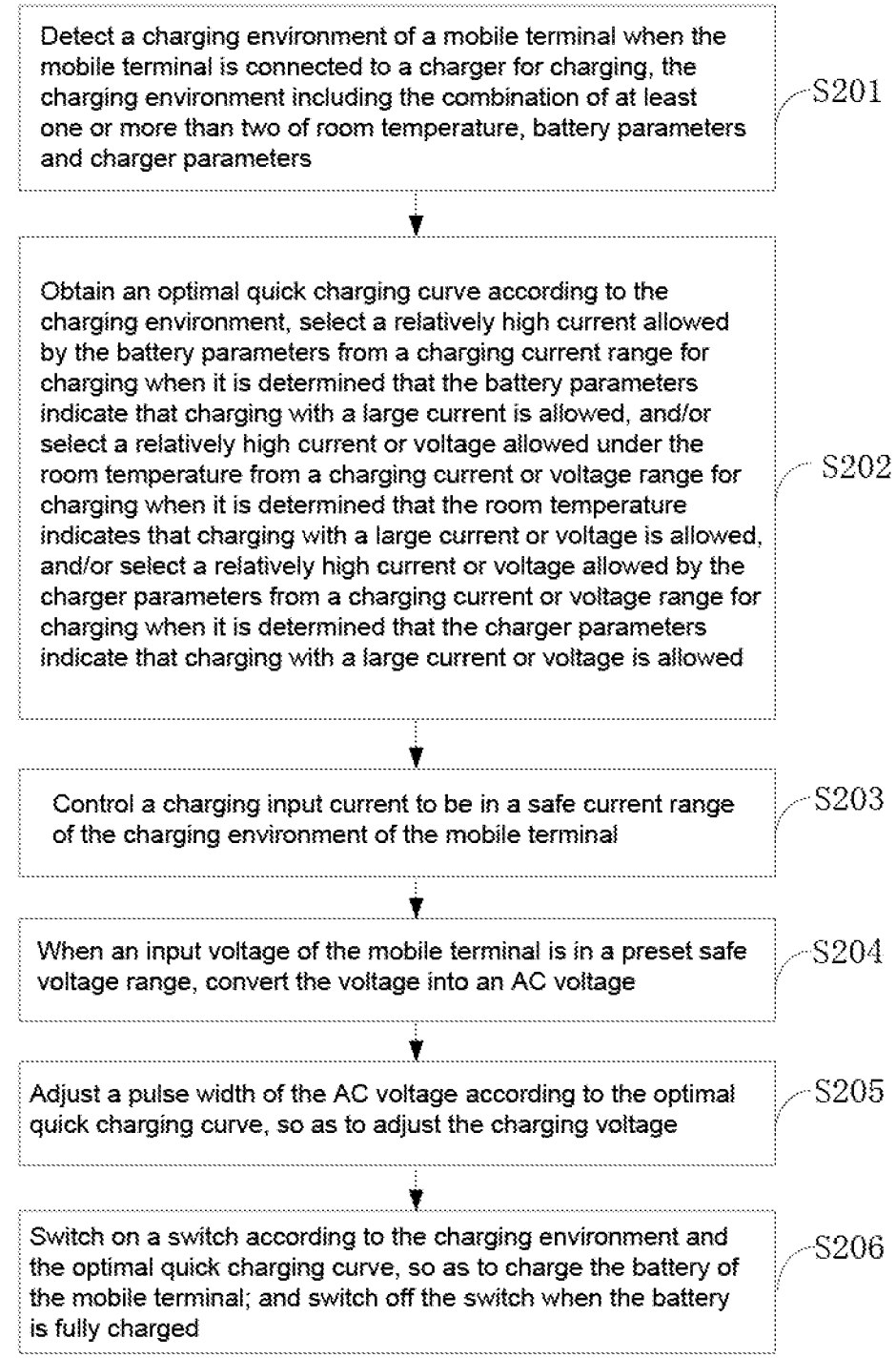
FIG. 8 depicts a schematic flow chart of another embodiment of a quick charging method of a mobile terminal according to the present disclosure.

Referring to FIG. 8, FIG. 8 depicts a schematic flow chart of another embodiment of a quick charging method of a mobile terminal according to the present invention. The method includes the following steps: S201, S202, S203, S204, S205, and S206.

S201: Detect a charging environment of the mobile terminal when the mobile terminal is connected to a charger for charging, the charging environment including the combination of at least one or more than two of room temperature, battery parameters and charger parameters.

S202: Obtain an optimal quick charging curve according to the charging environment, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

The steps S201 and S202 are similar to the steps S101 and S102 in the previous embodiment, and are not repeated herein. The process proceeds to step S203 according to data such as the detected charging environment and the optimal charging curve.

S203: Control a charging input current to be in a safe current range of the charging environment of the mobile terminal.

Current passing through a hardware environment in the mobile terminal, such as internal circuits, lines, and the battery, is limited. In other words, the hardware environment limits the passing current. If the current is over an allowed number, the battery or the mobile terminal will be damaged. For example, when a USB is used for charging, generally, current passing a device such as a standard USB interface and a USB charge cable is lower than 1 A. In other embodiment, different hardware may allow different charging currents to pass through. The current control circuit may be set to control the magnitude of the current during the charging process to be in a safe current range of the charging environment of each member of the mobile terminal. If the current is too high and exceeds the safe current, the current may be adjusted to be lower or the circuit may be disconnected. Meanwhile, the direction of the current may also be controlled, and current in an opposite direction cannot pass through the current control circuit. In an embodiment, the safe current ranges of other members may be preset in the terminal before leaving the factory.

S204: When an input voltage of the mobile terminal is in a preset safe voltage range, convert the voltage into an AC voltage.

Meanwhile, during the charging process, a voltage higher than a certain allowed number may also damage the hardware environment in the mobile terminal, and input and output voltages may also need to be controlled from being too high. Different mobile terminals use batteries having different materials and different types and are made by different manufacturing processes, and with different safe voltage ranges. Before the mobile terminal leaves the factory, the voltage control circuit may be set to set a safe voltage. When the voltage input by the charger to the mobile terminal is in the safe voltage range, the voltage control circuit may be used to convert the DC voltage output by the charger into the AC voltage. When the voltage input by the charger to the mobile terminal is not in the safe voltage range, the voltage control circuit outputs the voltage at a low level.

S205: Adjust a pulse width of the AC voltage according to the optimal quick charging curve, so as to adjust the charging voltage.

The pulse width of the AC voltage may be adjusted according to the optimal quick charging curve obtained in the step S202, the AC voltage obtained in the step S204 and the charging environment obtained in the step S201, so as to adjust the charging voltage of the battery, and control the charging voltage used to charge the battery.

S206: Switch on a switch according to the charging environment and the optimal quick charging curve, so as to charge the battery of the mobile terminal; and switch off the switch when the battery is fully charged.

The switch may be switched on according to the charging environment and the optimal quick charging curve obtained in the above steps, so that the DC charging voltage output by adjusting the pulse width in the step S205 may pass through to charge the mobile terminal. The current may be controlled to the large safe current in the optimal quick charging curve, thereby improving the charging voltage. According to the formula that the charging power P=U*I, the charging voltage and/or current may be increased to increase the charging power, so as to conduct quick charging on the mobile terminal. When the battery is fully charged, the switch is switched off to stop charging.

Figure 9:
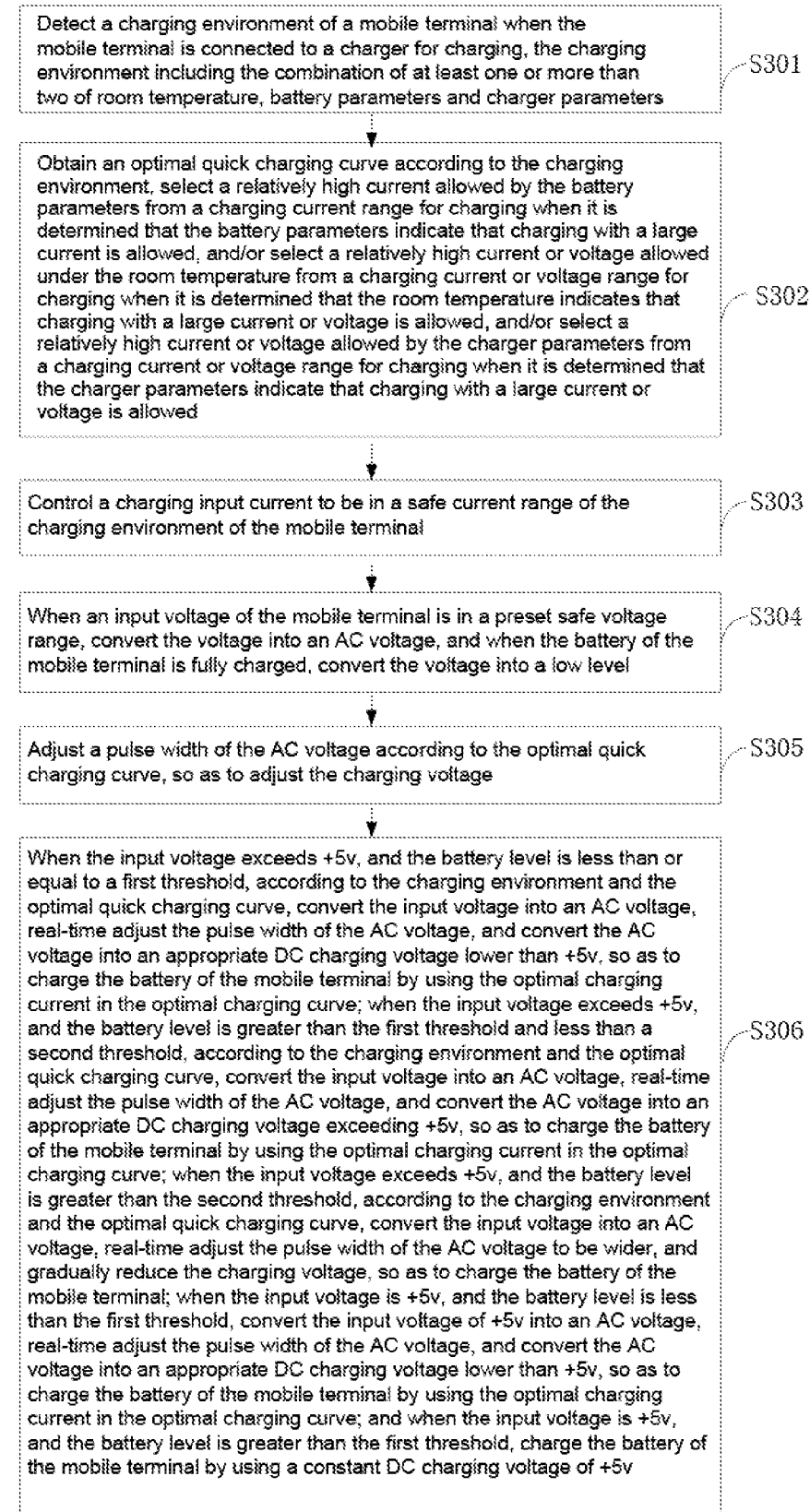
FIG. 9 depicts a schematic flow chart of an embodiment of a quick charging method of a mobile terminal according to the present disclosure.

Referring to FIG. 9, FIG. 9 is a schematic flow chart of another implementation manner of a quick charging method of a mobile terminal according to the present invention. The method includes: steps S301, S302, S303, S304, S305, and S306.

S301: Detect a charging environment of the mobile terminal when the mobile terminal is connected to a charger for charging, the charging environment including the combination of at least one or more than two of room temperature, battery parameters and charger parameters.

S302: Obtain an optimal quick charging curve according to the charging environment, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

S303: Control a charging input current to be in a safe current range of the charging environment of the mobile terminal.

S304: When an input voltage of the mobile terminal is in a preset safe voltage range, convert the voltage into an AC voltage, and when the battery of the mobile terminal is fully charged, convert the voltage into a low level.

S305: Adjust a pulse width of the AC voltage according to the optimal quick charging curve, so as to adjust the charging voltage.

The steps S301 and S305 are similar to the steps S201 and S205 in the previous embodiment, and are not repeated herein. The process proceeds to step S306 according to data such as the detected charging environment and the optimal charging curve.

S306: When the input voltage exceeds +5 v, and the battery level is less than or equal to a first threshold, real-time adjust the pulse width of the AC voltage, convert the AC voltage into an appropriate DC charging voltage lower than +5 v, and control the switch to be switched on, so as to charge the battery of the mobile terminal by using the optimal charging current in the optimal charging curve; when the input voltage exceeds +5 v, and the battery level is greater than the first threshold and less than a second threshold, real-time adjust the pulse width of the AC voltage, convert the AC voltage into an appropriate DC charging voltage exceeding +5 v, and control the switch to be switched on, so as to charge the battery of the mobile terminal by using the optimal charging current in the optimal charging curve; when the input voltage exceeds +5 v, and the battery level is greater than the second threshold, real-time adjust the pulse width of the AC voltage to be wider, gradually reduce the charging voltage, and control the switch to be switched on, so as to charge the battery of the mobile terminal by using the optimal charging current in the optimal charging curve; when the input voltage detected by the detecting circuit is +5 v, and the battery level is less than the first threshold, real-time adjust the pulse width of the AC voltage, convert the AC voltage into an appropriate DC charging voltage lower than +5 v, and control the switch to be switched on, so as to charge the battery of the mobile terminal by using the optimal charging current in the optimal charging curve; and when the input voltage is +5 v, and the battery level is greater than the first threshold, real-time adjust the pulse width of the AC voltage, convert the AC voltage into a DC charging voltage being +5 v, and control the switch to be switched on, so as to charge the battery of the mobile terminal.

When the mobile terminal is charged by using a high voltage charger, for example, when a charger input voltage is 10 v, according to the charging environment and the optimal quick charging curve obtained in the above steps, if the battery level is less than or equal to a first threshold, the battery level is very low, for example, the battery level is 1%, the battery will generate a severe polarization phenomenon, and in this case, applying a small voltage will generate a large current; therefore, according to the charging environment and the optimal quick charging curve, the voltage management sub-circuit may be used to convert the input voltage into an AC voltage, real-time adjust the pulse width of the AC voltage, convert the AC voltage into an appropriate DC charging voltage lower than +5 v, so as to charge the battery of the mobile terminal by using the optimal charging current in the optimal charging curve. If the battery level is greater than the first threshold and less than a second threshold, for example, the battery level is 50% of the total battery capacity, in this case, the battery is allowed to be charged by applying a large voltage; therefore, according to the charging environment and the optimal quick charging curve, the voltage input by the charger is converted into an AC voltage, the pulse width of the AC voltage is real-time adjusted, the AC voltage is converted into an appropriate DC charging voltage exceeding +5 v, for example, charging is conducted by using 8 v. In an embodiment, different batteries may have different battery capacities and different voltages, so as to charge the battery of the mobile terminal by using the optimal charging current in the optimal charging curve. If the battery level is greater than the second threshold, for example, the battery level is 95%, the battery temperature may be high and the resistance of the battery is low, in this case, generally it is needed to conduct charging by using a low voltage; therefore, according to the charging environment and the optimal quick charging curve, the voltage input by the charger is converted into an AC voltage, the pulse width of the AC voltage is real-time adjusted to be wider, and the charging voltage is gradually reduced, so as to charge the battery of the mobile terminal. When the high voltage output charger is used for charging, the charging voltage thereof assumes a mushroom shape having a high middle part and two lower ends.

When a conventional charger whose input voltage is +5 v is used for charging, if the battery level is less than the first threshold, a high voltage cannot be applied for charging, so that the input voltage of +5 v is converted into an AC voltage, the pulse width of the AC voltage is adjusted, the voltage is converted into an appropriate DC charging voltage lower than +5 v, so as to charge the battery of the mobile terminal by using the optimal charging current in the optimal charging curve. In an embodiment, the first threshold may be 20%. However, the first threshold and the second threshold may be different for different embodiments. In an embodiment, the battery of the mobile terminal may be charged by using a constant DC charging voltage of +5 v.

Figure 10:
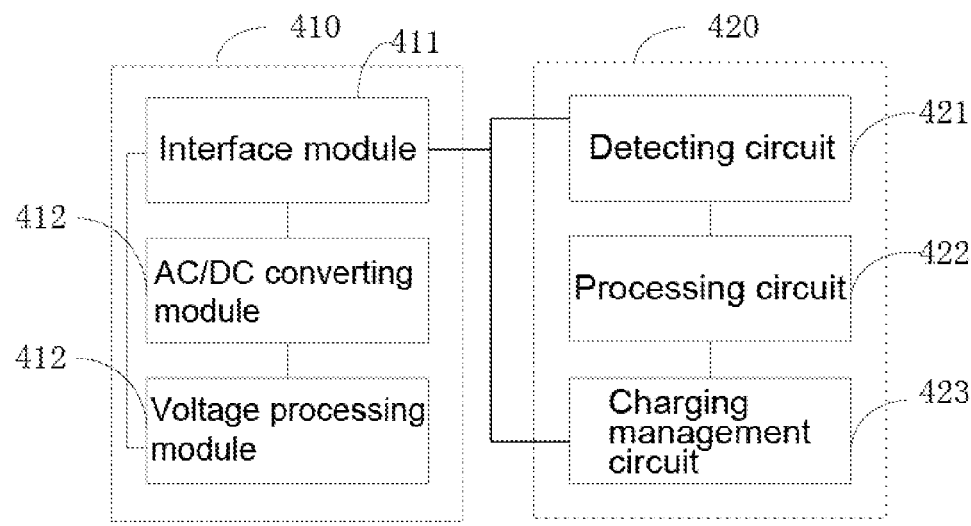
FIG. 10 depicts a schematic structural diagram of an embodiment of a quick charging system according to the present disclosure.

Referring to FIG. 10, FIG. 10 depicts a schematic structural diagram of an embodiment of a quick charging system according to the present disclosure. The system may include a charger 410 and a mobile terminal 420. The charger 410 includes an interface module 411, an AC/DC converting module 412, and a voltage processing module 413 that may be connected sequentially. The interface module 411 may further be connected to the voltage processing module 413. The mobile terminal 420 includes a detecting circuit 421, a processing circuit 422, and a charging management circuit 423 that are connected sequentially. The interface module 411 is directly or indirectly connected to the detecting circuit 421.

The interface module 411 may be used to output a voltage greater than +5 v or equal to +5 v to the mobile terminal 420.

The AC/DC converting module 402 may be used to convert a 220 v AC voltage into a DC voltage greater than +5 v or equal to +5 v.

The voltage processing module 403 may be used to receive information sent by the mobile terminal 420 to control the AC/DC converting module 402 to convert the AC voltage to a voltage greater than +5 v or equal to +5 v.

The detecting circuit 421 may be used to detect a charging environment of the mobile terminal 420 when the mobile terminal 420 is connected to the charger 410 for charging, the charging environment including the combination of at least one or more than two of room temperature, battery parameters and charger parameters.

The processing circuit 422 may be used to obtain an optimal quick charging curve according to the charging environment detected by the detecting circuit 421, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

The charging management circuit 423 may be used to control the charging power input to the mobile terminal according to the optimal quick charging curve obtained by the processing circuit 422 and a charger input voltage, so as to charge the mobile terminal 420.

Figure 11:
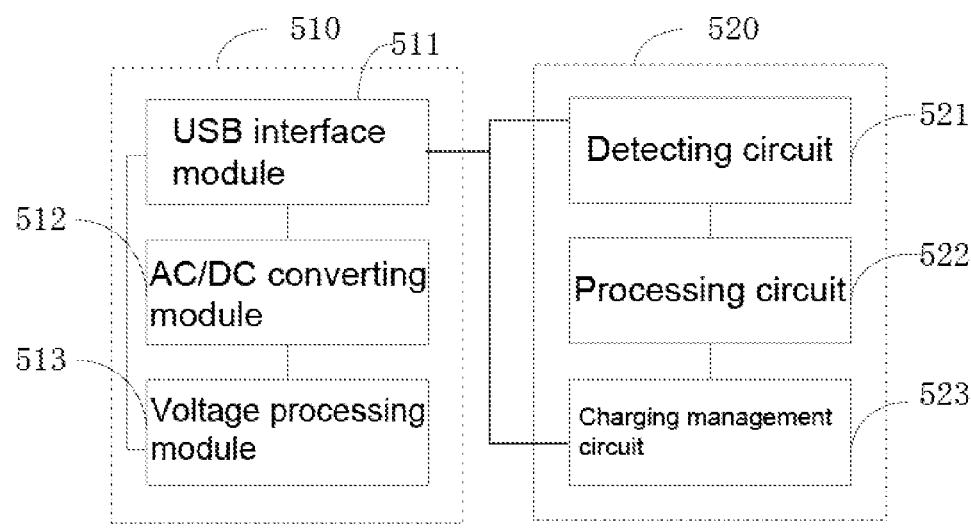
FIG. 11 depicts a schematic structural diagram of another embodiment of a quick charging system according to the present disclosure.

Referring to FIG. 11, FIG. 11 depicts a schematic structural diagram of another embodiment of a quick charging system according to the present invention. The system includes a charger 510 and a mobile terminal 520. The charger 510 includes an interface module 511, an AC/DC converting module 512, and a voltage processing module 513 that are connected sequentially. The interface module 511 is further connected to the voltage processing module 513. The mobile terminal 520 includes a detecting circuit 521, a processing circuit 522, and a charging management circuit 523 that are connected sequentially. The interface module 511 is directly or indirectly connected to the detecting circuit 521.

The USB interface module 501 may be used to output a voltage greater than +5 v or equal to +5 v. If the charger is a charger outputting a voltage greater than +5 v, a fool-proof design may be performed on the USB interface module. For example, a structural outline slot design may be added at the USB interface, that is, after a USB plug of the charger is connected to the terminal, the plug just sleeves the terminal, and cannot be connected to other terminals. In this way, only when the charger is connected to a target mobile, can the USB interface be connected for normal charging. In an embodiment, another fool-proof structure having the same function may be designed, and in this way, a dedicated charger outputting a high voltage will not be connected to another terminal by mistake, thereby ensuring the safety and specificity of the charger outputting the voltage greater than +5 v.

The AC/DC converting module 502 may be used to convert a 220 v AC voltage into a DC voltage greater than +5 v or equal to +5 v.

The voltage processing module 503 may be used to receive information sent by the terminal to control the AC/DC converting module 502 to convert the AC voltage to the fixed voltage greater than +5 v or equal to +5 v.

The detecting circuit 521 may be used to detect a charging environment of the mobile terminal 520 when the mobile terminal 520 is connected to the charger 510 for charging, the charging environment including the combination of at least one or more than two of room temperature, battery parameters and charger parameters.

The processing circuit 522 may be used to obtain an optimal quick charging curve according to the charging environment detected by the detecting circuit 521, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

The charging management circuit 523 may be used to control the charging power input to the mobile terminal according to the optimal quick charging curve obtained by the processing circuit 522 and a charger input voltage, so as to charge the mobile terminal.

Figure 12:
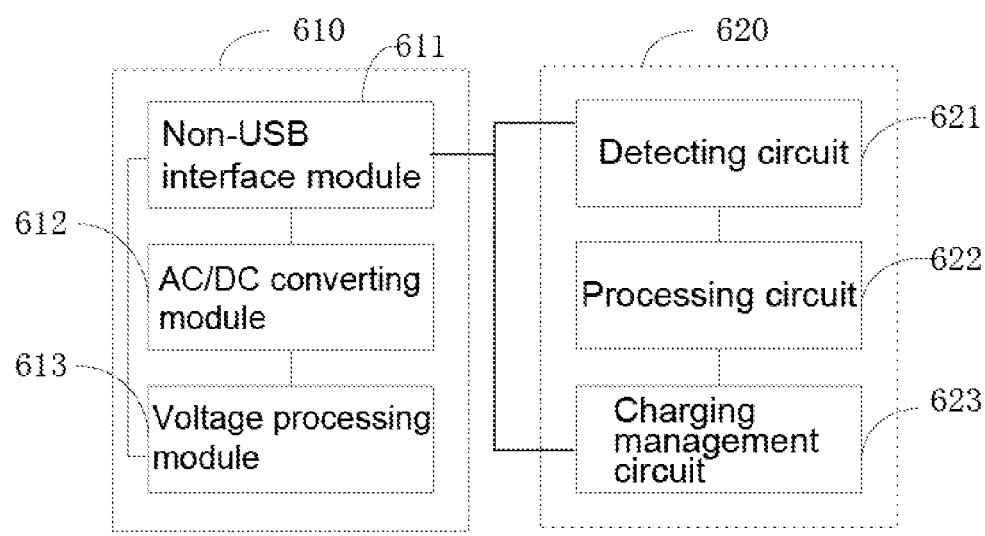
FIG. 12 depicts a schematic structural diagram of still another embodiment of a quick charging system according to the present disclosure.

Referring to FIG. 12, FIG. 12 depicts a schematic structural diagram of still another implementation manner of a quick charging system according to the present invention. The system may include a charger 610 and a mobile terminal 620. The charger 610 includes an interface module 611, an AC/DC converting module 612, and a voltage processing module 613 that are connected sequentially. The interface module 611 is further connected to the voltage processing module 613. The mobile terminal 620 includes a detecting circuit 621, a processing circuit 622, and a charging management circuit 623 that are connected sequentially. The interface module 611 is directly or indirectly connected to the detecting circuit 621.

A non-USB interface module 601 may be used to output a voltage greater than +5 v or equal to +5 v, and if the charger outputs a voltage of +5 v, the interface module is connected to a conventional terminal by connecting to an adapter, and if the charger is a charger outputting a voltage output greater than +5 v, the non-USB interface module 601 can only be connected to a terminal supporting charging in a high voltage.

The AC/DC converting module 602 may be used to convert a 220 v AC voltage into a DC voltage greater than +5 v or equal to +5 v.

The voltage processing module 603 may be used to receive information sent by the terminal to control the AC/DC converting module 602 to convert the AC voltage to a voltage greater than +5 v or equal to +5 v.

The detecting circuit 621 may be used to detect a charging environment of the mobile terminal when the mobile terminal 620 is connected to the charger 610 for charging, the charging environment including the combination of at least one or more than two of room temperature, battery parameters and charger parameters.

The processing circuit 622 is used to obtain an optimal quick charging curve according to the charging environment detected by the detecting circuit 621, select a first relatively high current allowed by the battery parameters from a charging current range for charging when it is determined that the battery parameters indicate that charging with the first relatively high current is allowed, and/or select a second relatively high current or voltage allowed under the room temperature from a charging current or voltage range for charging when it is determined that the room temperature indicates that charging with the second relatively high current or voltage is allowed, and/or select a third relatively high current or voltage allowed by the charger parameters from a charging current or voltage range for charging when it is determined that the charger parameters indicate that charging with the third relatively high current or voltage is allowed.

The charging management circuit 623 may be used to control the charging power input to the mobile terminal 620 according to the optimal quick charging curve obtained by the processing circuit 622 and a charger input voltage, so as to charge the mobile terminal 620.

The above descriptions are embodiments of the present disclosure, and are not intended to limit the scope of the present disclosure. Any equivalent structure or equivalent flow variation made by using the description and accompanying drawings of the present disclosure and applied directly or indirectly in other related technical fields shall all fall within the protection scope of the present disclosure.

The invention claimed is:

1. A quick charging mobile terminal, wherein the mobile terminal comprises:
 a detecting circuit and a battery connected to the detecting circuit, wherein the detecting circuit is configured to detect a charging environment of the mobile terminal when the mobile terminal is connected to a charger for charging, the charging environment comprising at least one of room temperature, battery parameters, and charger parameters; the detecting circuit comprises a first detecting sub-circuit, a second detecting sub-circuit and a third detecting sub-circuit, the first detecting sub-circuit is configured to detect the room temperature and a battery temperature, the second detecting sub-circuit is configured to detect the battery parameters, and the third detecting sub-circuit is configured to obtain the charger parameters through a charger interface;
 a processing circuit, wherein the processing circuit is configured to obtain an optimal quick charging curve according to the charging environment detected by the detecting circuit, select a first relatively high current allowed by the battery parameters from a charging current range for charging when it is determined that the battery parameters indicate that charging with the first relatively high current is allowed, or select a second relatively high current or voltage allowed under the room temperature from a charging current or voltage range for charging when it is determined that the room temperature indicates that charging with the second relatively high current or voltage is allowed, or select a third relatively high current or voltage allowed by the charger parameters from a charging current or voltage range for charging when it is determined that the charger parameters indicate that charging with the third relatively high current or voltage is allowed; and a charging management circuit, wherein the charging management circuit is configured to increase a charging power input to the mobile terminal according to the optimal quick charging curve obtained by the processing circuit to charge the mobile terminal, wherein the charging management circuit comprises a current control sub-circuit, a voltage control sub-circuit, a pulse width modulation sub-circuit, and a charging control sub-circuit, the current control sub-circuit is configured to control a charging current to be in a safe current range of the charging environment of the mobile terminal according to parameters detected by the detecting circuit or preset in the mobile terminal;

the voltage control sub-circuit is configured to: when a voltage of the mobile terminal is in a preset safe voltage range, convert the voltage into an AC voltage and transmit the AC voltage to the pulse width modulation sub-circuit;

the pulse width modulation sub-circuit is configured to adjust, according to the optimal quick charging curve obtained by the processing circuit, a pulse width of the AC voltage converted by the voltage control sub-circuit, so as to adjust the charging voltage; and the charging control sub-circuit is configured to control, according to the charging environment detected by the detecting circuit and the optimal quick charging curve obtained by the processing circuit, a switch to be switched on so that the charging voltage adjusted by the pulse width modulation sub-circuit charges the battery of the mobile terminal; and when the battery of the mobile terminal is fully charged, switch off the switch.

2. The mobile terminal according to claim 1, wherein the processing circuit is further configured to: when an input voltage detected by the detecting circuit exceeds +5 v and a battery level is less than or equal to a first threshold, control the pulse width modulation sub-circuit to real-time adjust the pulse width of the AC voltage output by the voltage control sub-circuit, convert the AC voltage into an appropriate DC charging voltage lower than +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the first threshold and less than a second threshold, control the pulse width modulation sub-circuit to real-time adjust the pulse width of the AC voltage output by the voltage control sub-circuit, convert the AC voltage into an appropriate DC charging voltage exceeding +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the second threshold, control the pulse width modulation sub-circuit to real-time adjust the pulse width of the AC voltage to be wider, gradually reduce the charging voltage, and control the charging control sub-circuit to switch on the switch, so as to charge the battery of the mobile terminal by using the optimal charging current in the optimal charging curve;

the processing circuit is further configured to: when an input voltage detected by the detecting circuit is +5 v and the battery level is less than the first threshold, control the pulse width modulation sub-circuit to real-time adjust the pulse width of the AC voltage output, convert the AC voltage into an appropriate DC charging voltage lower than +5 v, and control the charging control sub-circuit to switch on the switch, so as to charge the battery of the mobile terminal by using the optimal charging current in the optimal charging curve; and the processing circuit is further configured to: when an input voltage detected by the detecting circuit is +5 v and the battery level is greater than the first threshold, control the pulse width modulation sub-circuit to real-time adjust the pulse width of the AC voltage output, convert the AC voltage into a DC charging voltage being +5 v, and control the switch to be switched on, so as to charge the battery of the mobile terminal.

3. The mobile terminal according to claim 1, wherein a battery cabin of the mobile terminal comprises a fool-proof structure, the fool-proof structure is only applicable for a battery of a quick charging type to mount into the battery cabin; the terminal further comprises a display unit, and the display unit is configured to display a charging solution corresponding to the optimal quick charging curve, a charging amount, a charging time, and a residual charging time.

4. A quick charging mobile terminal, wherein the mobile terminal comprises:

a detecting circuit and a battery connected to the detecting circuit, wherein the detecting circuit is configured to detect a charging environment of the mobile terminal when the mobile terminal is connected to a charger for charging, the charging environment comprising at least one of room temperature, battery parameters and charger parameters;

a processing circuit, wherein the processing circuit is configured to obtain an optimal quick charging curve according to the charging environment detected by the detecting circuit, select a first relatively high current allowed by the battery parameters from a charging current range for charging when it is determined that the battery parameters indicate that charging with the first relatively high current is allowed, or select a second relatively high current or voltage allowed under the room temperature from a charging current or voltage range for charging when it is determined that the room temperature indicates that charging with the second relatively high current or voltage is allowed, or select a third relatively high current or voltage allowed by the charger parameters from a charging current or voltage range for charging when it is determined that the charger parameters indicate that charging with the third relatively high current or voltage is allowed; and a charging management circuit, wherein the charging management circuit is configured to increase a charging power input to the mobile terminal according to the optimal quick charging curve obtained by the processing circuit, so as to charge the mobile terminal.

5. The mobile terminal according to claim 4, wherein the charging management circuit comprises a current control sub-circuit, a voltage control sub-circuit, a pulse width modulation sub-circuit, and a charging control sub-circuit, the current control sub-circuit is configured to control the charging current to be in a safe current range of the charging environment of the mobile terminal according to parameters detected by the detecting circuit or preset in the mobile terminal;

the voltage control sub-circuit is configured to: when a voltage of the mobile terminal is in a preset safe voltage range, convert the voltage into an AC voltage and transmit the AC voltage to the pulse width modulation sub-circuit;

the pulse width modulation sub-circuit is configured to adjust, according to the optimal quick charging curve obtained by the processing circuit, a pulse width of the AC voltage converted by the voltage control sub-circuit, so as to adjust the charging voltage; and the charging control sub-circuit is configured to control, according to the charging environment detected by the detecting circuit and the optimal quick charging curve obtained by the processing circuit, a switch to be switched on so that the charging voltage adjusted by the pulse width modulation sub-circuit charges the battery of the mobile terminal; and when the battery of the mobile terminal is fully charged, switch off the switch.

6. The mobile terminal according to claim 5, wherein the processing circuit is further configured to: when an input voltage detected by the detecting circuit exceeds +5 v and a battery level is less than or equal to a first threshold, control the pulse width modulation sub-circuit to real-time adjust the pulse width of the AC voltage output by the voltage control sub-circuit, convert the AC voltage into an appropriate DC charging voltage lower than +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the first threshold and less than a second threshold, control the pulse width modulation sub-circuit to real-time adjust the pulse width of the AC voltage output by the voltage control sub-circuit, convert the AC voltage into an appropriate DC charging voltage exceeding +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the second threshold, control the pulse width modulation sub-circuit to real-time adjust the pulse width of the AC voltage to be wider, gradually reduce the charging voltage, and control the charging control sub-circuit to switch on the switch, so as to charge the battery of the mobile terminal by using the optimal charging current in the optimal charging curve;

the processing circuit is further configured to: when an input voltage detected by the detecting circuit is +5 v and the battery level is less than the first threshold, control the pulse width modulation sub-circuit to real-time adjust the pulse width of the AC voltage output, convert the AC voltage into an appropriate DC charging voltage lower than +5 v, and control the charging control sub-circuit to switch on the switch, so as to charge the battery of the mobile terminal by using the optimal charging current in the optimal charging curve; and the processing circuit is further configured to: when an input voltage detected by the detecting circuit is +5 v and the battery level is greater than the first threshold, control the pulse width modulation sub-circuit to real-time adjust the pulse width of the AC voltage output, convert the AC voltage into a DC charging voltage being +5 v, and control the switch to be switched on, so as to charge the battery of the mobile terminal.

7. The mobile terminal according to claim 4, wherein the detecting circuit comprises a first detecting sub-circuit, a second detecting sub-circuit and a third detecting sub-circuit, the first detecting sub-circuit is configured to detect the room temperature and the battery temperature, the second detecting sub-circuit is configured to detect the battery parameters, and the third detecting sub-circuit is configured to obtain the charger parameters through a charger interface.

8. The mobile terminal according to claim 4, wherein a battery cabin of the mobile terminal comprises a fool-proof structure, the fool-proof structure is only applicable for a battery of a quick charging type to mount into the battery cabin; the terminal further comprises a display unit, and the display unit is configured to display one or more of a charging solution corresponding to the optimal quick charging curve, a charging amount, a charging time, and a residual charging time.

9. A quick charging method for a mobile terminal, wherein the method comprises:

detecting a charging environment of the mobile terminal when the mobile terminal is connected to a charger for charging, the charging environment comprising at least one of room temperature, battery parameters of a battery, and charger parameters;

obtaining an optimal quick charging curve according to the charging environment, selecting a first relatively high current allowed by the battery parameters from a charging current range for charging when it is determined that the battery parameters indicate that charging with the first relatively high current is allowed, or selecting a second relatively high current or voltage allowed under the room temperature from a charging current or voltage range for charging when it is determined that the room temperature indicates that charging with the second relatively high current or voltage is allowed, or selecting a third relatively high current or voltage allowed by the charger parameters from a charging current or voltage range for charging when it is determined that the charger parameters indicate that charging with the third relatively high current or voltage is allowed; and increasing the charging power input to the mobile terminal according to the charging environment, the optimal quick charging curve and a charger input voltage, so as to charge the mobile terminal.

10. The method according to claim 9, wherein the step of increasing the charging power input to the mobile terminal according to the optimal quick charging curve to charge the mobile terminal comprises:
controlling a charging input current to be in a safe current range of the charging environment of the mobile terminal;
when an input voltage of the mobile terminal is in a preset safe voltage range, converting the input voltage into an AC voltage;
adjusting a pulse width of the AC voltage according to the optimal quick charging curve, so as to adjust the charging voltage; and
switching on a switch according to the charging environment and the optimal quick charging curve, so as to charge the battery of the mobile terminal; and switching off the switch when the battery is fully charged.

11. The method according to claim 10, wherein the step of switching on the switch according to the charging environment and the optimal quick charging curve, so as to charge the battery of the mobile terminal; and switching off the switch when the battery is fully charged specifically comprises:
when the input voltage exceeds +5 v and the battery level is less than or equal to a first threshold, real-time adjusting the pulse width of the AC voltage, converting the AC voltage into an appropriate DC charging voltage lower than +5 v, and controlling the switch to be switched on, so as to charge the battery of the mobile terminal by using the optimal charging current in the optimal charging curve;
when the input voltage exceeds +5 v and the battery level is greater than the first threshold and less than a second threshold, real-time adjusting the pulse width of the AC voltage, converting the voltage into an appropriate DC charging voltage exceeding +5 v, and controlling the switch to be switched on, so as to charge the battery of the mobile terminal by using the optimal charging current in the optimal charging curve;
when the input voltage exceeds +5 v and the battery level is greater than the second threshold, real-time adjusting the pulse width of the AC voltage to be wider, gradually reducing the charging voltage, and controlling the switch to be switched on, so as to charge the battery of the mobile terminal by using the optimal charging current in the optimal charging curve;
when the input voltage detected by the detecting circuit is +5 v and the battery level is less than the first threshold, real-time adjusting the pulse width of the AC voltage, converting the AC voltage into an appropriate DC charging voltage lower than +5 v, and controlling the switch to be switched on, so as to charge the battery of the mobile terminal by using the optimal charging current in the optimal charging curve; and
when the input voltage is +5 v and the battery level is greater than the first threshold, real-time adjusting the pulse width of the AC voltage output, converting the AC voltage into a DC charging voltage being +5 v, and controlling the switch to be switched on, so as to charge the battery of the mobile terminal.

12. The method according to claim 11, wherein the first threshold is 5%, and the second threshold is 85%.

13. A quick charging system, wherein the system comprises a charger, a mobile terminal, the mobile terminal comprises a detecting circuit, a processing circuit, a charging management circuit, the charger comprises an AC/DC converting module, a voltage processing module, and an interface module, wherein the detecting circuit is configured to detect a charging environment of the terminal when being connected to the charger for charging, the processing circuit is configured to obtain an optimal quick charging curve according to the charging environment detected by the detecting circuit, the charging management circuit is configured to adjust, according to the charging environment detected by the detecting circuit, the optimal quick charging curve obtained by the processing circuit and a charger input voltage, a charging power input to the mobile terminal, so as to charge the mobile terminal; the AC/DC converting module is configured to convert an obtained external voltage into a fixed DC voltage greater than +5 v or equal to +5 v and output the DC voltage to the terminal; the voltage processing module is configured to receive information sent by the terminal, and control the AC/DC converting module to convert the obtained external voltage into the fixed voltage greater than +5 v or equal to +5 v; and the interface module is configured to output the fixed voltage greater than +5 v or equal to +5 v to the detecting module.

14. The system according to claim 13, wherein the interface module is a USB interface module, and if the charger is a charger outputting a voltage greater than +5 v, the USB interface module comprises a fool-proof structure, the fool-proof structure is merely applicable to connect to a terminal supporting a charging voltage greater than +5 v; or the interface module is a non-USB interface module, the non-USB interface module comprises an adapter, and the adapter is used to match interfaces of different terminals.

15. The system according to claim 13, wherein the charging environment of the terminal comprises at least one of room temperature, battery parameters, and charger parameters.

16. The system according to claim 13, wherein the detecting circuit comprises a first detecting sub-circuit, a second detecting sub-circuit and a third detecting sub-circuit, the first detecting sub-circuit is configured to detect the room temperature and a battery temperature, the second detecting sub-circuit is configured to detect the battery parameters, and the third detecting sub-circuit is configured to obtain the charger parameters through the charger interface module.

17. The system according to claim 13, wherein the processing circuit is configured to obtain an optimal quick charging curve according to the charging environment detected by the detecting circuit, select a first relatively high current allowed by the battery parameters from a charging current range for charging when it is determined that the battery parameters indicate that charging with the first relatively high current is allowed, or select a second relatively high current or voltage allowed under the room temperature from a charging current or voltage range for charging when it is determined that the room temperature indicates that charging with the second relatively high current or voltage is allowed, or select a third relatively high current or voltage allowed by the charger parameters from a charging current or voltage range for charging when it is determined that the charger parameters indicate that charging with the third relatively high current or voltage is allowed.

18. The system according to claim 13, wherein the charging management circuit comprises a current control sub-circuit, a voltage control sub-circuit, a pulse width modulation sub-circuit, and a charging control sub-circuit,
the current control sub-circuit is configured to control a charging current to be in a safe current range of the charging environment of the mobile terminal according to parameters detected by the detecting circuit or preset in the mobile terminal;

the voltage control sub-circuit is configured to: when a voltage of the mobile terminal is in a preset safe voltage range, convert the voltage into an AC voltage and transmit the AC voltage to the pulse width modulation sub-circuit;

the pulse width modulation sub-circuit is configured to adjust, according to the optimal quick charging curve obtained by the processing circuit, a pulse width of the AC voltage converted by the voltage control sub-circuit, so as to adjust the charging voltage; and the charging control sub-circuit is configured to control, according to the charging environment detected by the detecting circuit and the optimal quick charging curve obtained by the processing circuit, a switch to be switched on so that the charging voltage adjusted by the pulse width modulation sub-circuit charges the battery of the mobile terminal; and when the battery of the mobile terminal is fully charged, switch off the switch.

19. The system according to claim 13, wherein the processing circuit is further configured to: when an input voltage detected by the detecting circuit exceeds +5 v and a battery level is less than or equal to a first threshold, control the pulse width modulation sub-circuit to real-time adjust the pulse width of the AC voltage output by the voltage control sub-circuit, convert the AC voltage into an appropriate DC charging voltage lower than +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the first threshold and less than a second threshold, control the pulse width modulation sub-circuit to real-time adjust the pulse width of the AC voltage output by the voltage control sub-circuit, convert the AC voltage into an appropriate DC charging voltage exceeding +5 v, and control the charging control sub-circuit to switch on the switch, so as to charge the battery of the mobile terminal by using the optimal charging current in the optimal charging curve;

the processing circuit is further configured to: when an input voltage detected by the detecting circuit exceeds +5 v and the battery level is greater than the second threshold, control the pulse width modulation sub-circuit to real-time adjust the pulse width of the AC voltage to be wider, gradually reduce the charging voltage, and control the charging control sub-circuit to switch on the switch, so as to charge the battery of the mobile terminal by using the optimal charging current in the optimal charging curve;

the processing circuit is further configured to: when an input voltage detected by the detecting circuit is +5 v and the battery level is less than the first threshold, control the pulse width modulation sub-circuit to real-time adjust the pulse width of the AC voltage output, convert the AC voltage into an appropriate DC charging voltage lower than +5 v, and control the charging control sub-circuit to switch on the switch, so as to charge the battery of the mobile terminal by using the optimal charging current in the optimal charging curve; and the processing circuit is further configured to: when an input voltage detected by the detecting circuit is +5 v and the battery level is greater than the first threshold, control the pulse width modulation sub-circuit to real-time adjust the pulse width of the AC voltage output, convert the AC voltage into a DC charging voltage being +5 v, and control the switch to be switched on, so as to charge the battery of the mobile terminal.

20. The system according to claim 19, wherein the first threshold is 5%, and the second threshold is 85%.

* * * * *